United States Patent [19]
Yamaguchi et al.

[11] Patent Number: 5,988,765
[45] Date of Patent: Nov. 23, 1999

[54] FLUID PRESSURE CONTROL DEVICE

[75] Inventors: Naoki Yamaguchi, Nishiuomiya; Osamu Akamatsu, Akashi, both of Japan

[73] Assignee: Nabco, Ltd., Nichi-Ku Kobe, Japan

[21] Appl. No.: 08/891,357

[22] Filed: Jul. 10, 1997

[30] Foreign Application Priority Data

Jul. 22, 1996 [JP] Japan .................................. 8-191970

[51] Int. Cl.$^6$ .................................................. B60T 8/18
[52] U.S. Cl. ........................................................ 303/22.6
[58] Field of Search ........................... 137/487.5, 625.64, 137/627.5, 596.16, 85; 251/30.1; 303/22.6, 15

[56] References Cited

U.S. PATENT DOCUMENTS

| | | | |
|---|---|---|---|
| 4,773,447 | 9/1988 | Imanaka et al. | 137/627.5 |
| 4,960,365 | 10/1990 | Horiuchi | 417/222 |
| 4,971,049 | 11/1990 | Rotariu et al. | 128/204.21 |
| 5,007,455 | 4/1991 | Hawker | 137/596.16 |
| 5,687,765 | 11/1997 | You | 137/627.5 |
| 5,771,933 | 6/1998 | Akamatsu et al. | 137/627.5 |
| 5,775,367 | 7/1998 | Yamaguchi et al. | 137/487.5 |

*Primary Examiner*—Robert J. Oberleitner
*Assistant Examiner*—Melanie Talavera
*Attorney, Agent, or Firm*—James Ray & Associates

[57] ABSTRACT

A fluid pressure control device having a 3-position solenoid valve which is controlled to switch between a supply position, an overlapping position, and an exhaust position, using a drive command value corresponding to a pressure command signal. It also has a drive command setting unit which computes a drive command value for driving the 3-position solenoid valve into a predetermined position, in order to make the pressure command signal and a feedback signal of the output pressure of the 3-position solenoid valve coincide and a compensating value setting unit which computes a compensating value to be added to or subtracted from the above-mentioned drive command value, in accordance with the pressure differential between the above-mentioned pressure command signal and feedback signal, and the proportion of change in the feedback signal. The fluid pressure control device further has an addition and subtraction processing unit which computes a compensation amount by integrating the compensating value output from the compensating value setting unit when the drive command value has strayed from the overlapping command value corresponding to the overlapping position of the 3-position solenoid valve, and adds or subtracts the above-mentioned compensation amount to or from the drive command value, in the direction departing from the above-mentioned overlapping position, so as to output a new drive command value to the 3-position solenoid valve.

4 Claims, 7 Drawing Sheets

FLUID PRESSURE CONTROL DEVICE

FIELD OF THE INVENTION

The present invention relates, in general, to a fluid pressure control device, and, more particularly, this invention relates to a fluid pressure control device that controls the fluid pressure supplied to the air brake device of a railway vehicle using a 3-position solenoid valve.

BACKGROUND OF THE INVENTION

An example of a conventional type fluid pressure control device which controls the output pressure to the brake cylinder of an air brake device disposed on a railway vehicle is one which uses a 3-position solenoid valve which is controlled to switch between three positions: a supply position in which the output pressure will be increased, an overlapping position in which the output pressure is cut off and maintained at a constant value, and an exhaust position in which the output pressure will be reduced. One such conventional type fluid pressure control device can be seen, for example, in Japanese Laid-Open Utility Model H 7-31020).

This fluid pressure control device can generate an output pressure corresponding to a pressure command signal by outputting drive command values (coil current values) of 3 stages in order to control the 3-position solenoid valve in the exhaust position, supply position or overlapping position upon receiving a pressure command signal equivalent to a brake command. In the case where different drive command values are needed when the 3-position solenoid valve moves from the exhaust position to the overlapping position, and when it moves from the supply position to the overlapping position, there are instances where drive command values corresponding to the overlapping position are set in 2 stages. In this case, drive command values of 4 stages can be input to the 3-position solenoid valve.

However, the above-mentioned fluid pressure control device of the prior art has experienced problems in that, since the switching of the 3-position solenoid valve is normally controlled by 3-stage or 4-stage drive command values, overshoot and undershoot will inevitably occur when the output pressure to the brake cylinder is made to coincide with the pressure command signal. Furthermore, a relatively long time is needed before the output pressure converges with the pressure command signal, and since the 3-position solenoid valve switches frequently, the life of the 3-position solenoid valve is shortened.

Thus, there have been ideas advanced to prevent this undesirable overshoot and undershoot by comparing the output pressure of the 3-position solenoid valve with the pressure command signal and outputting any desired drive command value from the afore-mentioned supply position to the exhaust position, in the direction in which the output pressure and the pressure command signal will coincide, thereby controlling the degree of valve opening of the 3-position solenoid valve.

The aforementioned 3-position solenoid valve has problems in that factors such as variations in the spring force of the return spring, fluctuations in the sliding resistance to sliding parts due to the adhesiveness of the grease, and variations in the attraction characteristics of the coil mean that the degree of valve opening differs a little with each 3-position solenoid valve. It has likewise been observed that during operation even with the same 3-position solenoid valve, the same degree of valve opening will not necessarily be achieved, even with the same pressure command signal, due to changes encountered throughout the year.

In particular, therefore, some problems will likely result in those instances in which, when a drive command value close to the drive command value for the overlapping position is output to the 3-position solenoid valve, the degree of valve opening is even less than required because of the aforementioned variations and the like, and a long time is required before the output pressure corresponds with the pressure command signal, or it settles while there is still a difference between the output pressure and the pressure command signal.

SUMMARY OF THE INVENTION

In a presently preferred embodiment of the present invention there is provided a fluid pressure control device characterized in that it has a 3-position solenoid valve which is controlled to switch between a supply position in which an output pressure is increased, an overlapping position in which the output pressure is cut off, and an exhaust position in which the output pressure is reduced upon receiving a drive command value corresponding to a pressure command signal. The preferred embodiment also includes a pressure sensor which generates a feedback signal of the output pressure and a drive command setting component which computes a desired drive command value by putting the 3-position solenoid into the exhaust position from the supply position in order to make the pressure command signal and the feedback signal coincide, which it does upon receiving a pressure command signal and a feedback signal. The present invention also includes a compensating value setting component which outputs a compensating value to be added to or subtracted from the drive command value when it is judged that the proportion of change in the feedback signal is less than a reference value. The present invention further includes an addition and subtraction processing unit which will compute a compensation amount by integrating a compensating value output from compensating value setting element when it is judged that the drive command value has strayed from an overlapping command value output when the 3-position solenoid valve is put in an overlapping position, and adds or subtracts the compensation amount to or from the drive command value, in the direction departing from such overlapping position so as to output a new drive command value to such 3-position solenoid valve.

OBJECTS OF THE INVENTION

It is, therefore, one of the primary objects of the present invention to provide a fluid pressure control device which is capable of making the output pressure settle as rapidly as possible to the pressure command signal while at the same time preventing undesirable overshoot and undershoot relative to the pressure command signal.

It is another object of the present invention to provide a fluid pressure control device where the time required for the output pressure to converge with the pressure command signal is decreased.

Still yet another object of the present invention is to provide a fluid pressure control device in which the useful life of such 3-position solenoid valve is increased.

In addition to the various objects and advantages of the present invention which has been described in some detail above, various other objects and advantages of the invention will become more readily apparent to those persons who are skilled in railway braking systems and, more particularly, to fluid pressure control devices from the following more detailed description of such invention, particularly, when such detailed description is taken in conjunction with the attached drawing Figures and with the appended claims.

Figure 1:
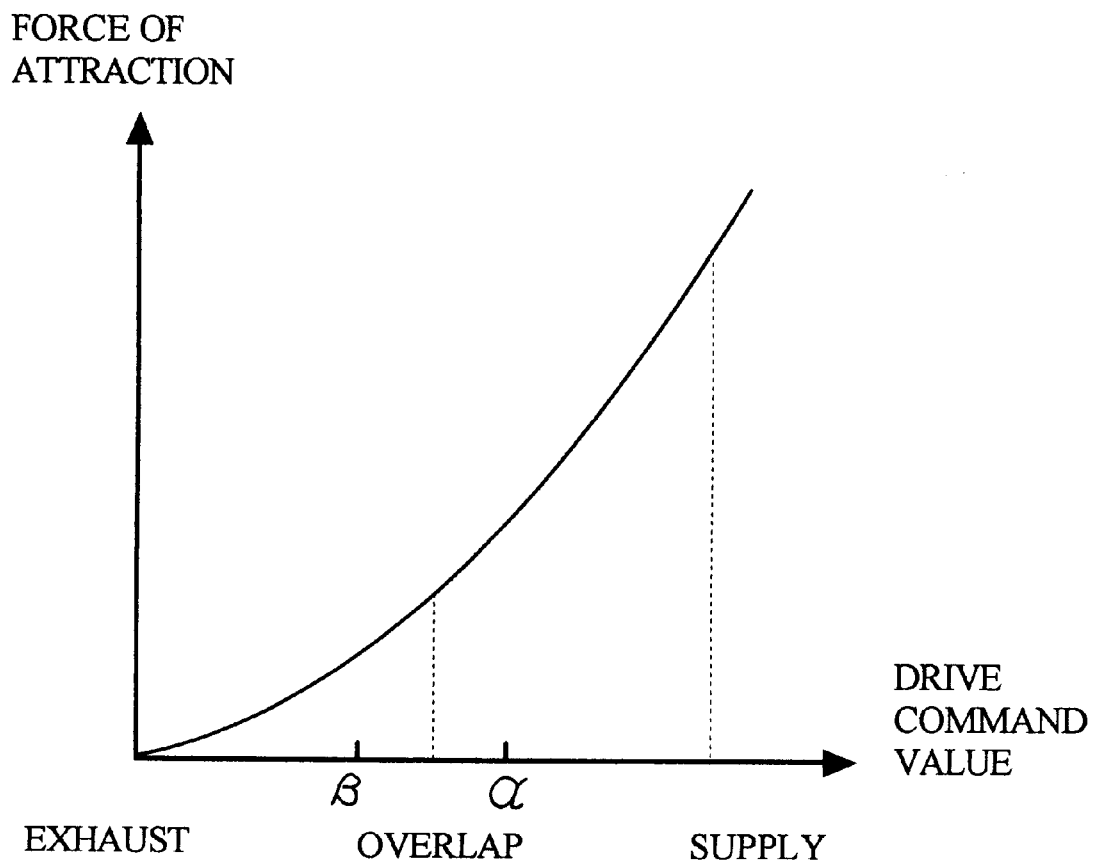
FIG. 1 is a graph illustrating the relationship between the drive command value (coil current value) and the force of attraction of a 3-position solenoid valve.

BRIEF DESCRIPTION OF THE PRESENTLY PREFERRED AND VARIOUS ALTERNATIVE EMBODIMENTS OF THE INVENTION

Prior to proceeding to the more detailed description of the various embodiments of the present invention, it should be noted that, for both the sake of clarity and understanding of the fluid pressure control device according to the present invention, identical components which have identical functions have been identified with identical reference numerals throughout the several views which have been illustrated in the attached drawing Figures.

Figure 2:
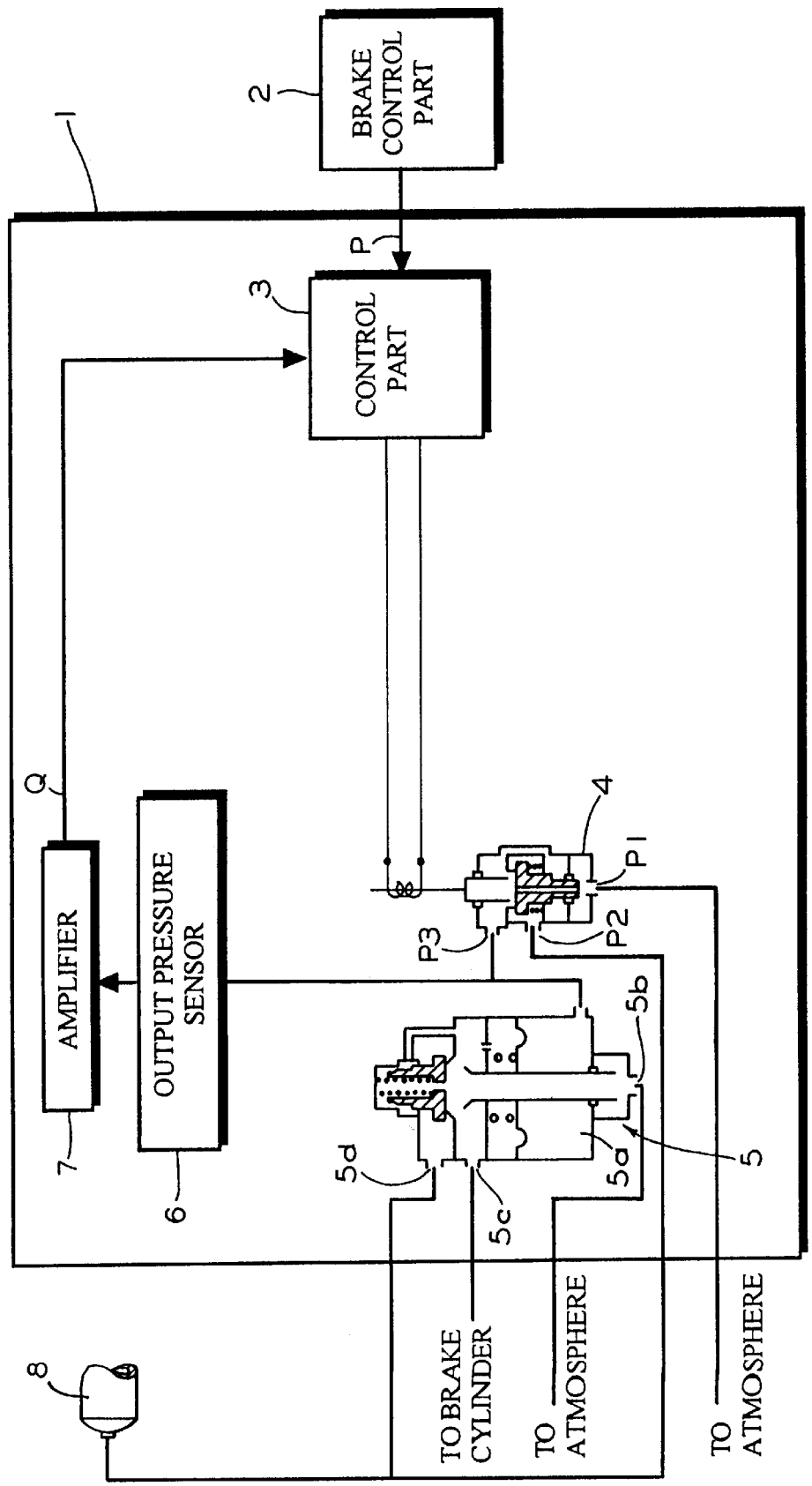
FIG. 2 is a schematic illustration of a fluid pressure control device showing one presently preferred embodiment of the invention.

A presently preferred embodiment of the present invention is described below with reference to the figures. This embodiment relates to, by way of example, a fluid pressure control device which controls the fluid pressure (air pressure) supplied to the air brake device of a railroad vehicle. As shown in FIG. 2, the fluid pressure control device, generally designated 1, has a control member 3 into which a pressure command signal P is input from a brake control member 2, a 3-position solenoid valve 4 is controlled in drive by such control member 3, a relay valve 5 which amplifies the output pressure of such 3-position solenoid valve 4 and supplies it to a brake cylinder, (not shown) of the above-mentioned air brake device, a pressure sensor 6 which detects the output pressure of the 3-position solenoid valve 4, and an amplifier 7 which amplifies the output pressure detected by the pressure sensor 6 and supplies it to the control member 3 in the form of a feedback signal Q.

The 3-position solenoid valve 4 has a first port P1 which is open to the atmosphere. A second port P2 is connected to a supply air reservoir 8, and a third port P3 is connected to the pressure chamber 5a of a relay valve 5. The arrangement is such that, in the exhaust position, the first and third ports P1 and P3, respectively, of the 3-position solenoid valve 4 are in contact with each other and the output pressure is reduced; in the supply position, the second and third ports P2 and P3 are in contact with each other and the output pressure is increased; and in the overlapping position, the first, second and third ports P1, P2 and P3 are all cut off from each other and the output pressure is kept constant.

Further, the relay valve 5 has a first port 5b that is open to the atmosphere, a second port 5c is connected to such brake cylinder, and a third port 5d is connected to the supply air reservoir 8, being arranged in such a way that the output pressure of the 3-position solenoid valve 4 is amplified and supplied from the second port 5c to the brake cylinder.

Figure 3:
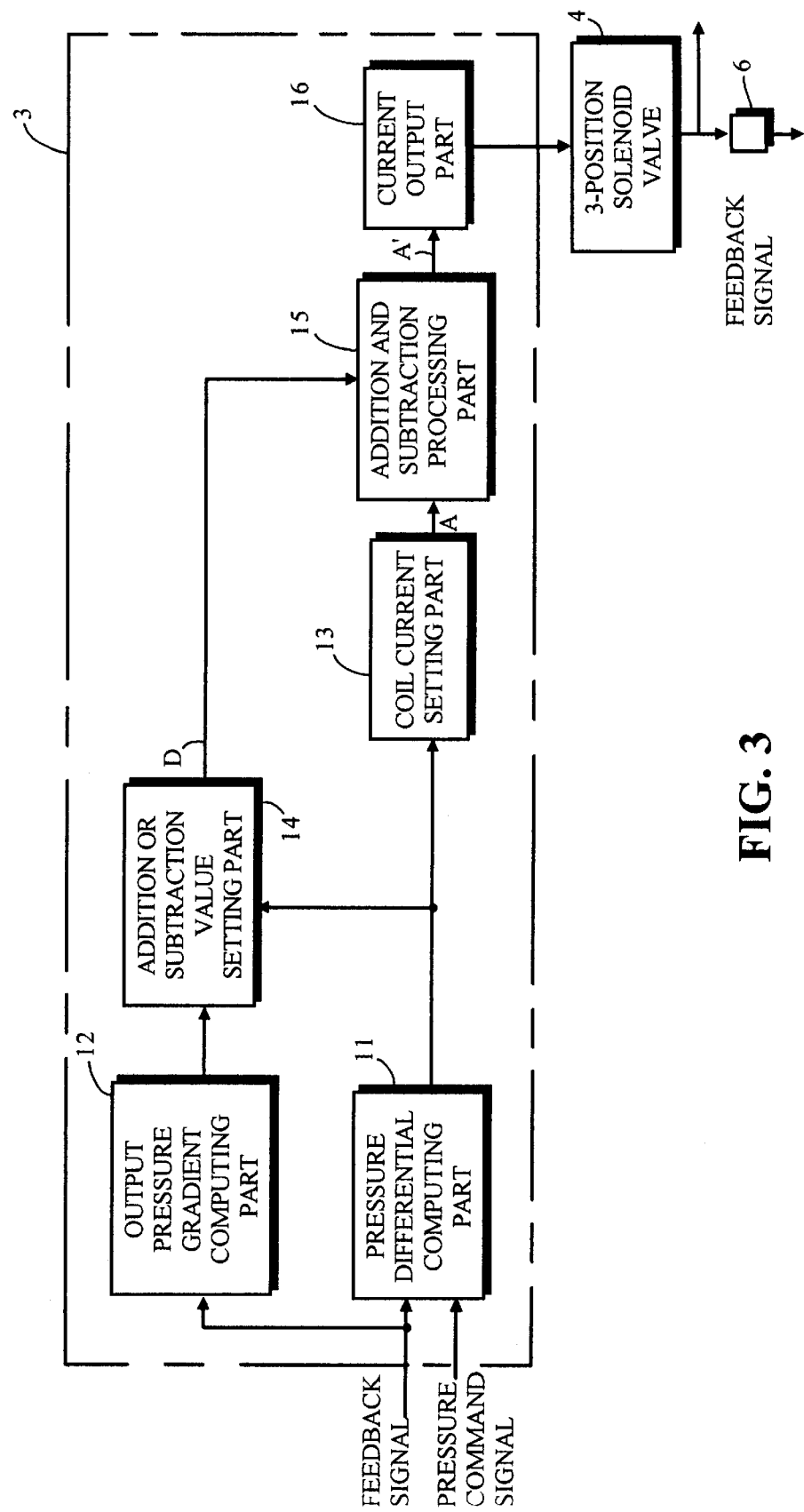
FIG. 3 is a block structural diagram showing the control part of the fluid pressure control device according to the present invention.

As illustrated in FIG. 3, the control member 3 is equipped with a pressure differential computing unit 11 which computes the pressure differential between the command pressure (command value for the output pressure of the 3-position solenoid valve) and the actual output pressure, based on a pressure command signal input from the brake control member 2 and corresponding to the above-mentioned command pressure and on a feedback signal fed back from the amplifier 7 and corresponding to the actual output pressure of such 3-position solenoid valve 4. Control member 3 also has an output pressure gradient computing unit 12 which computes the gradient of the above-mentioned actual output pressure based on the feedback signal, a coil current setting element 13 (drive command setting part) which sets the coil current value A (drive command value) to be supplied to the 3-position solenoid valve 4 based on the above-mentioned pressure differential, an addition or subtraction value setting unit 14 (compensating value setting part) which computes the addition or subtraction value D (compensating value) to be added to or subtracted from the coil current value A, based on the above-mentioned pressure differential and output pressure gradients and an addition and subtraction processing unit 15 which outputs a new coil current value A obtained by adding or subtracting the addition or subtraction value D to or from the coil current value A. Control member 3 further has a current output element 16 which outputs, to the 3-position solenoid valve 4, a coil current corresponding to the coil current value A output from the addition and subtraction processing unit 15.

Figure 4:
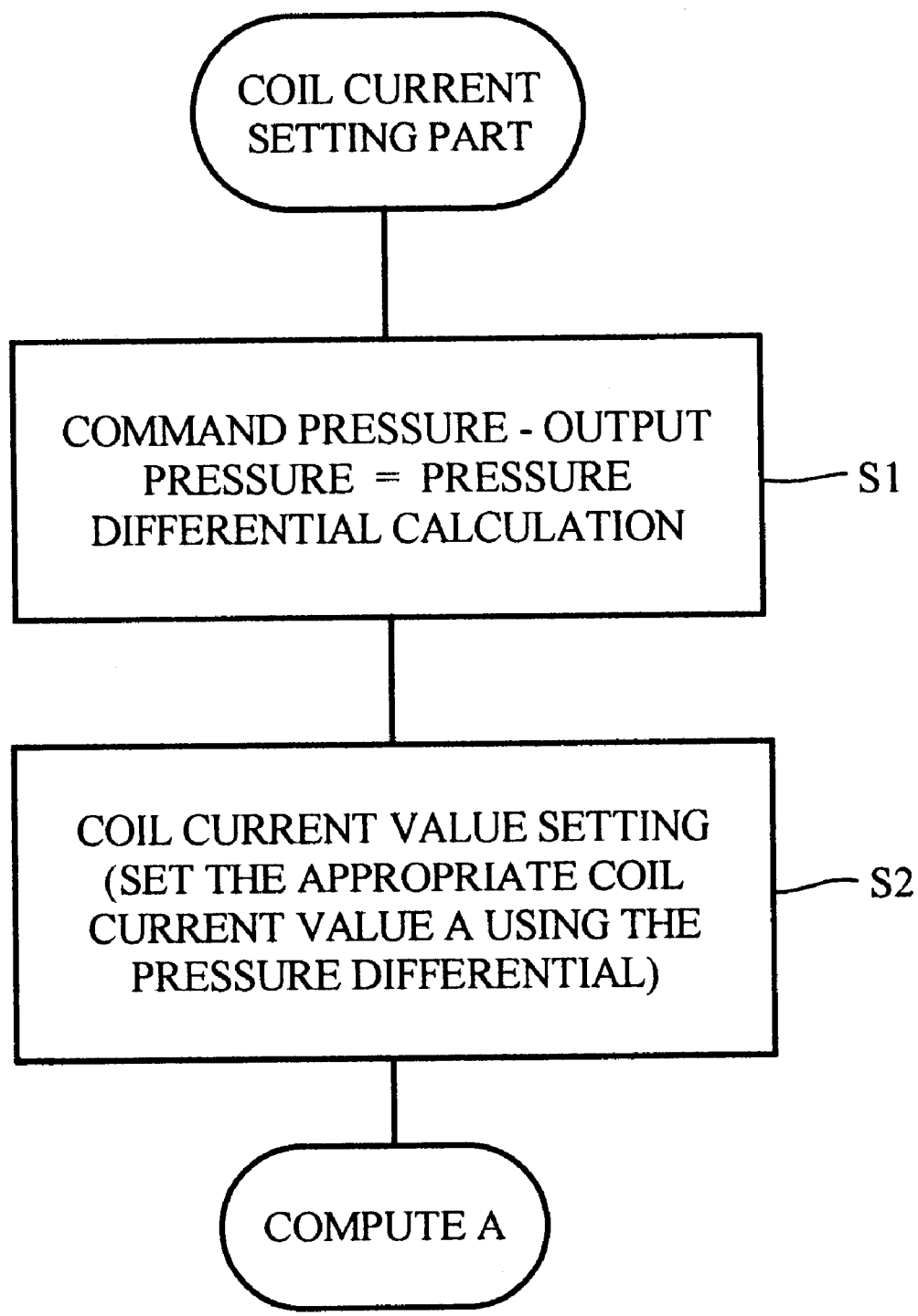
FIG. 4 is a flow chart illustrating the action sequence of a coil current setting part of the fluid pressure control device according to the present invention.

As shown in the flow chart in FIG. 4, the coil current setting unit 13 computes (S1) the pressure differential between the command pressure corresponding to the pressure command signal, and the actual output pressure of the 3-position solenoid valve 4 corresponding to the feedback signal, and, based on this pressure differential, computes (S2) the coil current value A.

Figure 5:
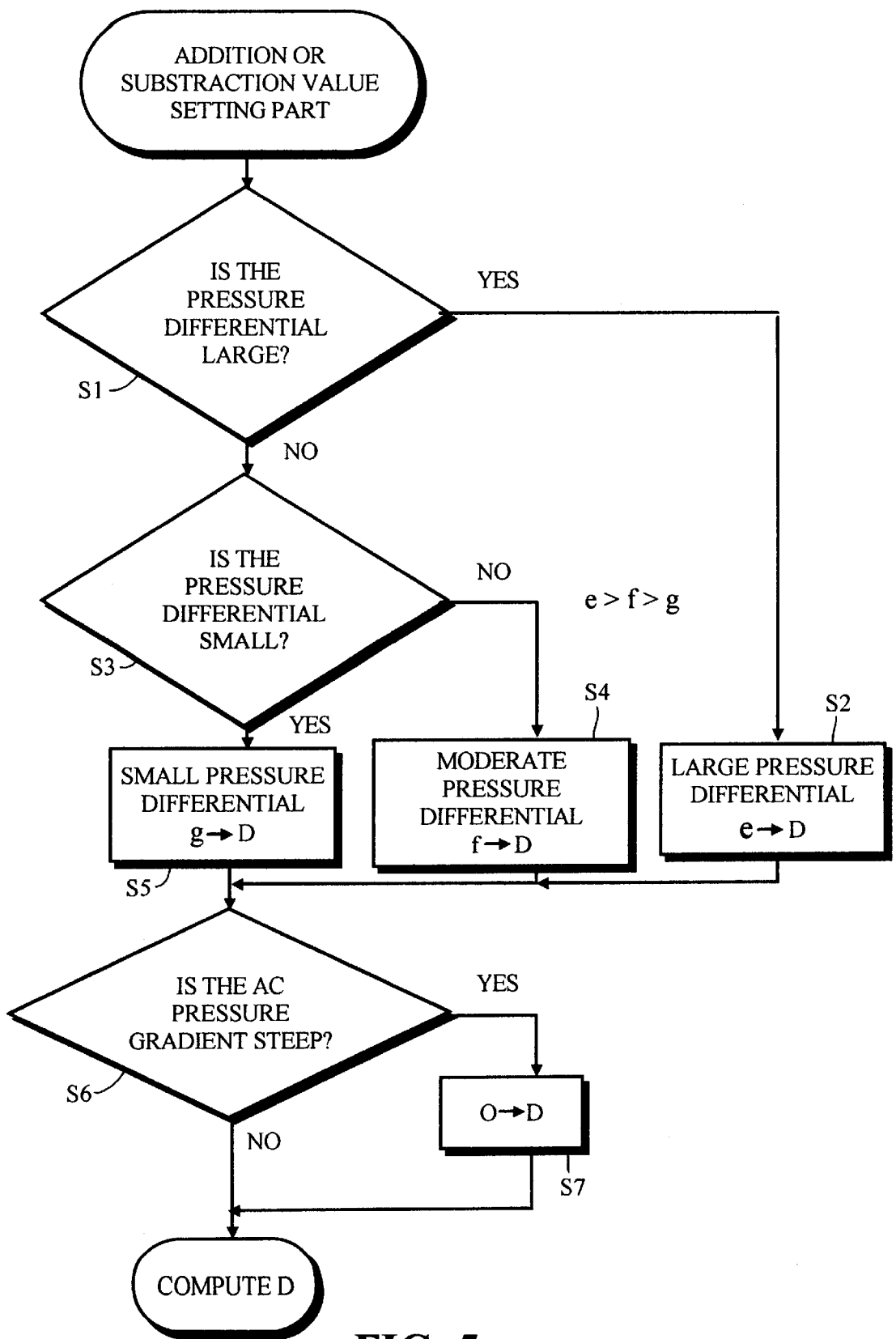
FIG. 5 is a flow chart illustrating the action sequence of the addition or subtraction amount setting component of the fluid pressure control device according to the present invention.

As shown in the flow chart in FIG. 5, the addition or subtraction value setting unit 14 decides (S1) whether the above-mentioned pressure differential is greater than a first reference value a1 and, if the result of the decision is "yes", in other words if the pressure differential is large, it sets (S2) the addition or subtraction value D as e. If the result of the decision in S1 is "no", it then decides (S3) whether the above-mentioned pressure differential is less than a second reference value a2 (a2<a1) and, if the result of that decision is "no", in other words if the pressure differential is moderate, it sets (S4) the addition or subtraction value D as f. If the result of the decision in S3 is "yes", in other words if the pressure differential is small, it sets (S5) the addition or subtraction value D as g. Here, e>f>g.

Next, it decides (S6) whether the gradient of the output pressure of the 3-position solenoid valve 4 is steep, in other words whether the above-mentioned gradient is greater than a reference value and, if the result of the decision is "yes", it substitutes (S7) "0" for the above-mentioned addition or subtraction value D while, on the other hand. if the result of the decision in (S6) is "no", in other words if the above-mentioned gradient is at or below the reference value and relatively gentle, the addition or subtraction value D is kept unchanged as the above-mentioned set value of e, f or g.

Figures 6A, 6B:
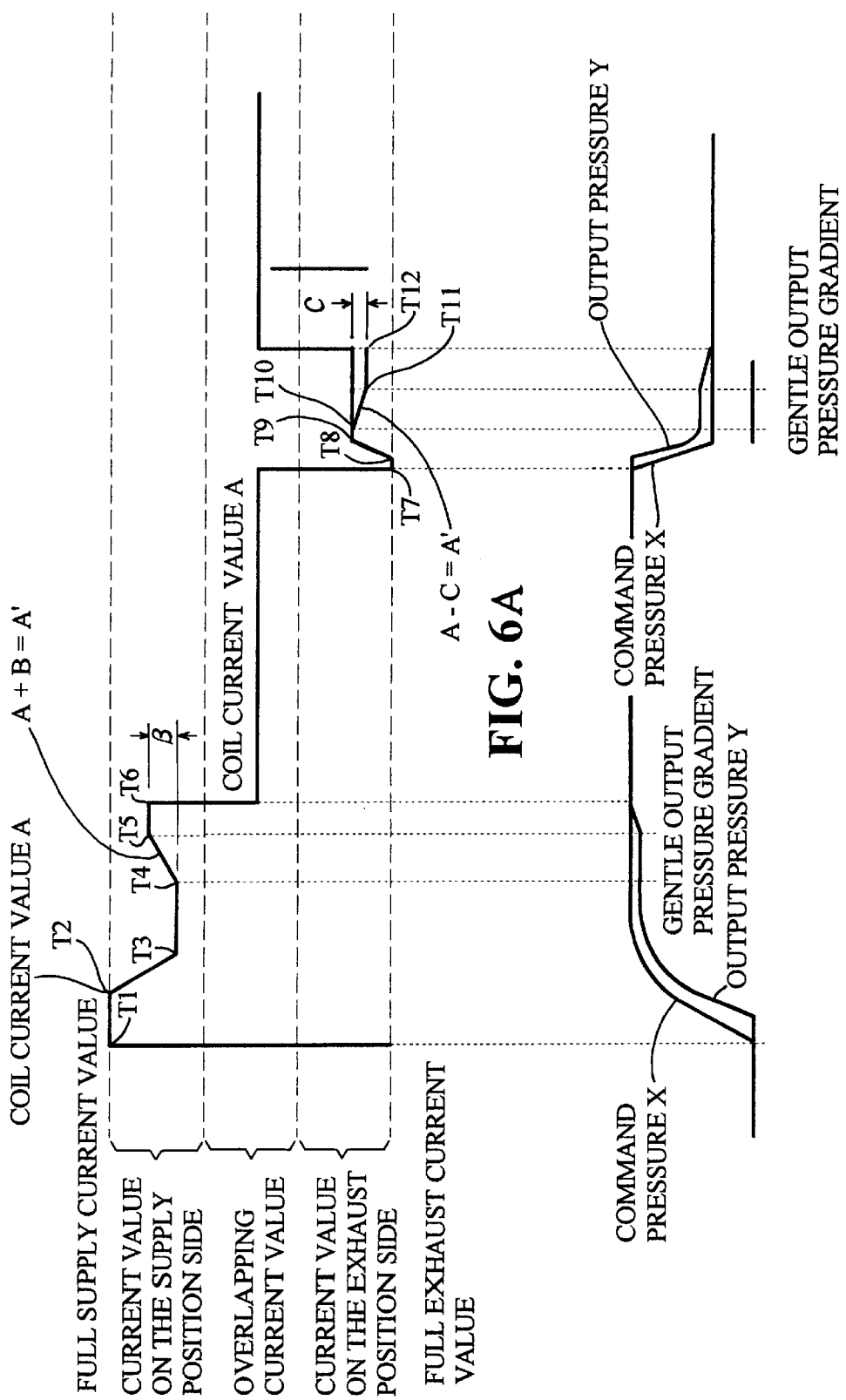
FIG. 6 is a time chart that illustrates the relationship between the coil current value supplied to the 3-position solenoid valve of the fluid pressure control device, and the command pressure and actual output pressure of the 3-position solenoid valve according to the present invention.

As shown in FIG. 6 (a), referring to the coil current value A, the lower limit is the full exhaust current value, and the upper limit is the full supply current value. Between these values, the region above the full exhaust current value and below B is the current value on the exhaust position side, the region above B and below α is the overlapping current value, and the region above α and below the full supply current value is the current value on the supply position side.

Figure 7:
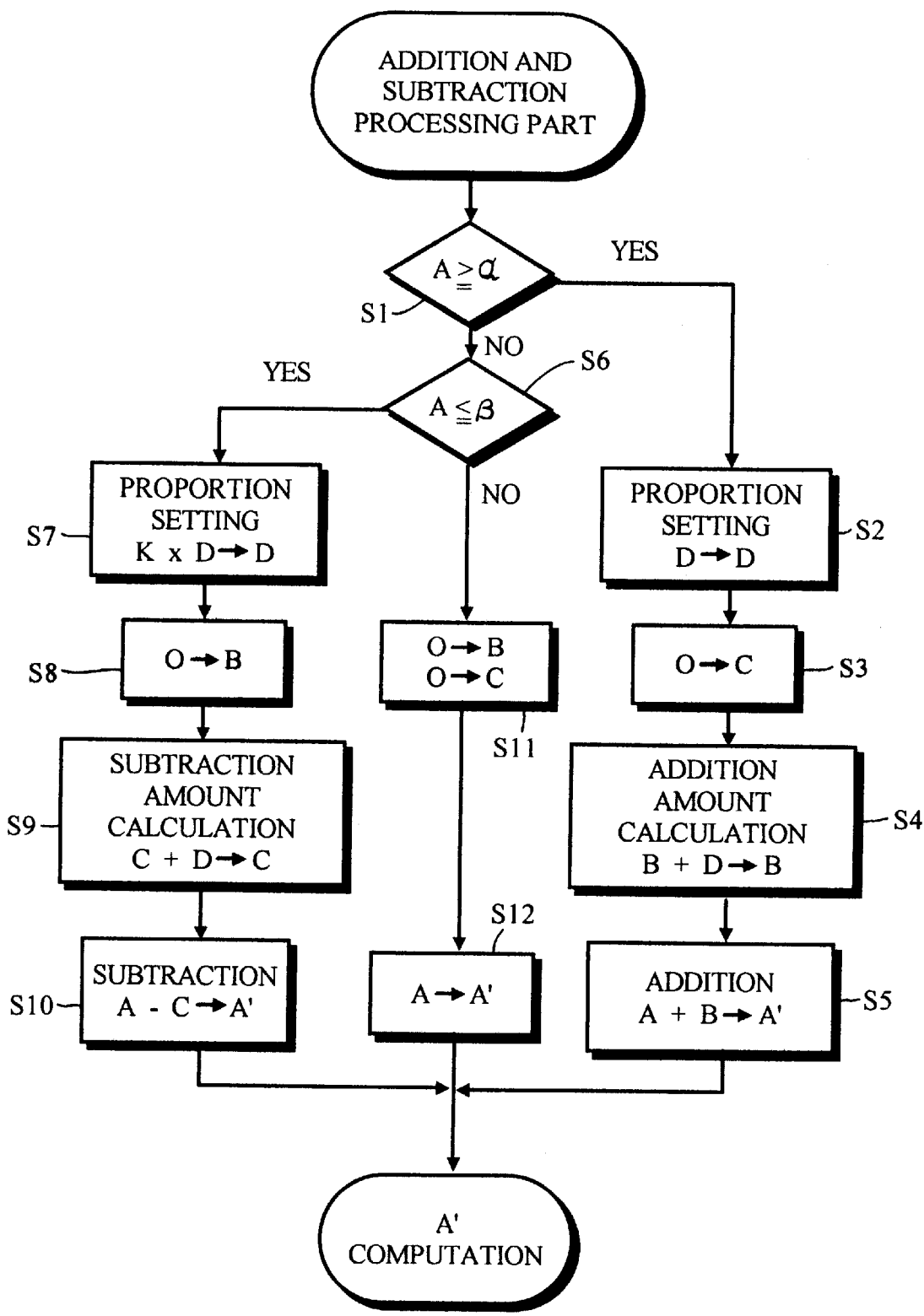
FIG. 7 is a flow chart that illustrates the action sequence of the addition and subtraction processing component of the fluid pressure control device according to the present invention.

As shown in the flow chart in FIG. 7, the addition and subtraction processing unit 15 decides (S1) whether the coil current value A is above α, in other words whether it is a current value on the supply position side and, if the result of the decision is "yes", sets a multiple of 1 as the proportionate setting of the addition or subtraction value D. In other words, D is set unaltered as the addition or subtraction value D (S2). Then, "0" is set as the subtraction amount C, and the previous subtraction amount C is cleared (S3). In this way, the previous subtraction amount C accumulated on the exhaust position side is cleared even when the coil current value A moves directly from a current value on the exhaust position side to a current value on the supply position side without going through an overlapping current value. Consequently, since the subtraction amount C has an initial value of "0" even when the coil current value A moves directly to a current value on the exhaust position side without going through an overlapping current value, the subtraction amount on the exhaust position side is accurately found.

Then, the addition amount B, which is the compensation amount on the supply position side, is calculated (S4). In other words, on the supply position side, when the output pressure of the 3-position solenoid valve 4 is increased but, for example, is settling before the output pressure reaches the command pressure, then the above-mentioned output pressure must be further increased to the command pressure by adding the addition amount B to the coil current value A. When the coil current value A is switched from a current value on the exhaust position side to a current value on the supply position side, the addition amount B has an initial value of "0" and, by adding the above-mentioned addition or subtraction value D to it, a new addition value B is obtained. Also, by adding the addition amount B to the coil current value A output from the coil current setting unit 13, a new coil current value A' is determined (S5).

When the coil current value A in S1 is less than α, in other words when it is not a current value on the supply position side, then a decision is made (S6) whether the coil current value A in S6 is less than B, in other words whether it is a current value on the exhaust position side. If A is at or below B, in other words if it is a current value on the exhaust position side, K (K>1) is next set as the output proportion of the addition or subtraction value D, and K×D is taken as the new addition or subtraction value D (S7). Here, as shown in FIG. 1, the attraction force of the 3-position solenoid valve 4 is arranged in such a way that the operating characteristic of the 3-position solenoid valve 4 is more or less uniform on the supply position side and the exhaust position side by making the output proportion of the addition or subtraction value D greater on the exhaust position side since there is a greater proportion of variation in the region where the coil current value A (drive command value) is high, in other words the supply position side, than in the region where the coil current value A is low, in other words the exhaust position side.

After the above-mentioned output proportion has been set, the value "0" is then set (S8) as the addition amount B.

As in S3 above, this is to temporarily clear the addition amount B accumulated on the supply position side when the coil current value A moves directly from a current value on the supply position side to a current value on the exhaust position side without going through an overlapping current value. Next, a new subtraction value C is determined (S9) by adding the addition or subtraction value D to the subtraction value C (the initial value will be "0" when moving from the supply position side or the overlapping position side to the exhaust position side). Also, a new coil current value A' is determined (S10) by subtracting the subtraction amount C from the coil current value A.

In S6, when A>B, in other words when the coil current value A is an overlapping current value, the addition amount B and the subtraction amount C are then set to "0" and the previous addition amount B and subtraction amount C are cleared (S1). This prevents the inconvenience of the coil current value A straying from the overlapping current value and moving to a current value on the supply position side or current value on the exhaust position side due to the addition amount B or subtraction amount C being added to or subtracted from the overlapping current value when the coil current value A is an overlapping current value, and clears the addition amount B or the subtraction amount C in advance in order to make "0" the initial value of the addition amount B or subtraction amount C in the current value on the supply position side or the current value on the exhaust position side when the coil current value A moves from the overlapping current value to the current value on the supply position side or the current value on the exhaust position side. When the coil current value A is an overlapping current value, the coil current value A is provided (S12) unchanged as the new coil current value A' by the addition and subtraction processing unit 15.

An example of the control achieved of such output pressure of such 3-position solenoid valve 4 will now be described with reference to the time chart in FIG. 6. As illustrated in FIG. 6 (a), prior to the time t1 position, the brake cylinder of the above-mentioned air brake device is in the exhaust state and, therefore, the coil current value A is the full exhaust current value, in which case the command pressure X and the actual output pressure Y of the 3-position solenoid valve 4 are coincident as shown in FIG. 6.

When the above-mentioned brake cylinder is supplied with air pressure and the braking state is attained, at time t1, the control member 3 of the fluid pressure control device 1 shown in FIG. 2 switches the coil current value A from the full exhaust current value to the full supply current value, in correspondence with the start of an increase in the pressure command signal output from the brake control unit 2, corresponding to the command pressure X of the 3-position solenoid valve 4, in the control member 3. Then, as shown in the flow chart in FIG. 4, the coil current setting unit 13 of the control member 3 sets the coil current value A based on the pressure differential between the command pressure X and the output pressure Y.

Because the actual output pressure Y does not rise due to a time delay occurring after the time t1 position until time t2, the above-mentioned pressure differential becomes larger and the coil current value A maintains the full supply current value. When the actual output pressure Y rises at time t2, the pressure differential between the command pressure X and the output pressure Y then gradually reduces and, as shown in the interval between t2 and t3 in FIG. 6 (a), the coil current setting unit 13 gradually reduces the coil current value A within the range of the current value on the supply position side.

Because the above-mentioned pressure differential does not change much in the interval from after the time t3 position until time t4 as shown in FIG. 6 (b), the coil current value A maintains a more or less constant value within the range of the current value on the supply position side as shown in FIG. 6 (a). In this interval between t3 and t4, an addition or subtraction value D (e, f or g) corresponding to the pressure differential is set by the addition or subtraction value setting unit 14, in the flow chart in FIG. 5, and since the result of the decision whether there is a steep gradient to the output pressure Y in S6 is "yes", the addition or subtraction value D in S7 is "0" and, as a result, there is no compensation of the coil current value A in the addition and subtraction processing unit 15.

Subsequent to time t4, there is a pressure differential between the command pressure X and output pressure Y, and the gradient of the output pressure Y is gentle, and there is therefore a risk that, in this state, the output pressure Y will settle before reaching the command pressure X. In the present invention, however, in the interval subsequent to time t4 until t5, the result of the decision in S6 of the flow chart shown in FIG. 5 is "no", the addition or subtraction value D (e, f or g) is added to the addition amount B in S4 of the flow chart in FIG. 7, and, in S5, this addition amount B is added to the coil current value A and the result is output as a new coil current value A', and thus, as shown in the interval between time t4 and t5 in FIG. 6 (a), the coil current value A' gradually increases, which is to say changes in a direction departing from the overlapping current value.

Subsequent to time t5, the effects of the gradual increase in the coil current value A' appear in the interval between the time t4 and t5, the output pressure Y gradually increases and approaches the command pressure X. In this way, since a gradient again emerges in the output pressure Y, in the interval between the time t5 and t6, the decision in S6 of the flow chart in FIG. 4 is "yes" and consequently the addition or subtraction value D in S7 is "0" and the coil current value A is again more or less constant.

When the output pressure Y is coincident with the command pressure X at time t6, the output pressure Y is then maintained constant and the desired braking state is maintained and, therefore, the coil current setting unit 13 lowers the coil current A to a value close to the central value of the overlapping current value ("beta" or above, "alpha" or below), and then the coil current value A is maintained at the above-mentioned overlapping current value as long as the above-mentioned braking state is maintained.

Next, when the above-mentioned braking state is discontinued or relaxed at time t7, if the brake control member 2 lowers the pressure command signal, corresponding to the command pressure X, the control member 3 responds thereto and lowers the coil current value A to the full exhaust current value. Subsequently, the action between the times t7 and t12 is the reverse of the action during braking between the times t1 and t6 described above, and it is therefore not discussed in detail here. It should be noted that during the relaxing action, in the interval between time t10 and t11, the subtraction amount C integrated with the addition or subtraction amount D is subtracted from the coil current value A so that a new coil current value A' is outputted, and thus the coil current value A' reduces, in other words changes in the direction departing from the overlapping current value, and, based on this, subsequent to time t11, the output pressure Y reduces and is coincident with the command pressure X at time t12.

It should be noted that although in the above described embodiment of the present invention the command pressure X in FIG. 6 (b) and the corresponding pressure command signal change in an analog fashion toward a target value, the command pressure X and pressure command signal may change in a digital fashion. Further, in the above-mentioned embodiment the coil current value was used as the drive command value for driving the 3-position solenoid valve 4, but the coil voltage may be used instead of the coil current value. Again, an arrangement was adopted in which the drive command value (coil current value, etc.) is high on the supply position side and the drive command value is low on the exhaust position side, as shown in FIG. 1, but conversely one may use a 3-position solenoid valve in which the drive command value is low on the supply position side and the drive command value is high on the exhaust position side.

As described above, the fluid pressure control device of the present invention has a 3-position solenoid valve 4 which is controlled to switch between a supply position in which the output pressure is increased, an overlapping position in which the output pressure is cut off, and an exhaust position in which the output pressure is reduced, upon receiving a drive command value corresponding to a pressure command signal P. The fluid pressure control device 1 further includes a pressure sensor 6 which generates a feedback signal of the above-mentioned output pressure and a drive command setting unit 13 which computes any desired drive command value between putting the 3-position solenoid valve 4 into the exhaust position from the supply position, in order to make the above-mentioned pressure command signal and feedback signal coincide, which it does upon receiving the above-mentioned pressure command signal and feedback signal. The present invention also includes an addition or subtraction setting unit (compensating value setting unit) 14 which outputs an addition or subtraction value (compensating value) D to be added to or subtracted from the above-mentioned drive command value when it is judged that the proportion of change in the above-mentioned feedback signal is less than a reference value, and an addition and subtraction processing unit 15 which computes the compensation amount by integrating the compensating value output from the compensating value setting unit 14 when it is judged that the drive command value has strayed from the overlapping command value output when the 3-position solenoid valve 4 is put in the overlapping position, and adds or subtracts the compensation amount to or from the drive command value, in the direction departing from the overlapping position, so as to output a new drive command value to 3-position solenoid valve 4.

It follows that, when the proportion of variation in the feedback signal is less than a reference value while there is a pressure differential between the pressure command signal and the feedback signal, and there is a risk of settling without the feedback signal being coincident with the pressure command signal, the pressure command signal and the feedback signal can be rapidly made to coincide by using the above-mentioned compensation amount to compensate the drive command value.

More specifically, when the pressure command signal P for putting the 3-position solenoid valve 4 in the above-mentioned supply position or exhaust position is output, the above-mentioned drive command setting unit 13 computes the drive command value A based on the pressure command signal P and on a feedback signal corresponding to the output of the above-mentioned 3-position solenoid valve 4, and drives the 3-position solenoid valve 4 based on this drive command value. Then, when the feedback signal approaches the pressure command signal P, the above-mentioned drive command setting unit 13 controls the degree of opening of the 3-position solenoid valve 4 by outputting a drive command value close to the overlapping command value for putting the 3-position solenoid valve 4 in the overlapping position, in order to prevent overshoot or undershoot.

In this case there is a risk that, if the degree of opening of the 3-position solenoid valve 4 is smaller than necessary, the proportion of variation in the feedback signal will be less than the reference value in a state in which there is a pressure differential between the pressure command signal P and the feedback signal and the output pressure will settle while the above-mentioned pressure differential exists, and therefore an output compensation value D is provided by the above-mentioned compensating value setting unit 14, and a compensation amount in which this compensating value has been integrated is added to or subtracted from the above-mentioned drive command value by the above-mentioned addition and subtraction processing unit 15, this being provided as a new drive command value. Thus, any pressure differential between the above-mentioned feedback signal and pressure command signal is eliminated and the feedback signal rapidly comes to coincide with the pressure command signal P.

In another embodiment of the invention, the fluid pressure control device 1 is one in which the above-mentioned compensating value setting unit 14 increases or decreases the above-mentioned compensating value in correspondence with the magnitude of the pressure differential between the above-mentioned pressure command signal P and feedback signal, and it follows that the output pressure can be made to reach the pressure command signal P all the more rapidly.

Here, by increasing or decreasing the compensating value in correspondence with the above-mentioned pressure differential, in other words making the compensating value larger when the pressure differential is large and making the compensating value smaller when the pressure differential is small, it is possible to make the output pressure rapidly reach the pressure command signal P without producing any undesirable overshoot or undershoot.

In yet another embodiment of the invention, the fluid pressure control device 1 is one in which the above-mentioned addition and subtraction processing unit 15 will nullify the above-mentioned computed compensation amount when it is judged that the above-mentioned overlapping command value has been output from the above-mentioned drive command setting unit 13.

More specifically, from the state in which the 3-position solenoid valve 4 is in the supply position or exhaust position, when the 3-position solenoid valve 4 switches to the overlapping position due to the above-mentioned overlapping command value being provided, the output pressure is cut off and maintained at a constant value. In this case, there is a risk that if the above-mentioned compensating value integrated in the immediately preceding supply position or exhaust position remains unchanged, the drive command value will stray from the overlapping command value and will switch to the supply command value corresponding to the supply position or else the exhaust command value corresponding to the exhaust position due to the compensating value being added to or subtracted from the above-mentioned overlapping command value, but, the above-mentioned compensation amount can be nullified at the time when the overlapping command value is provided, thus making it possible to maintain the overlapping command value in the overlapping position, and to maintain the accuracy of the output pressure relative to the pressure command signal P. Further, the compensation amount can be temporarily cleared in the overlapping position, thereby making it possible to have the compensation amount start from an initial value of "0" when moving to the supply position or the exhaust position.

The fluid pressure control device 1, according to yet another embodiment, is one which has the configuration of the previous embodiment in which the above-mentioned addition and subtraction processing unit 14 will temporarily nullify the above-mentioned computed compensation amount when it is judged that the above-mentioned drive command value has a newly output value on the supply position side or the exhaust position side.

More specifically, there can be cases in which, with the drive command value not outputting the overlapping command value, switching occurs from the supply position side directly to the exhaust position side, or from the exhaust position side directly to the supply position side due to factors such as abrupt fluctuations in the pressure command signal, and in such cases the above-mentioned compensation amount can be temporarily nullified at the time of switching from the supply position side to the exhaust position side, or from the exhaust position side to the supply position side, thereby making it possible to output a new compensation amount with "0" as the initial value on the exhaust position side or supply position side after the switching, and making it possible to prevent an erroneous compensation amount being added to or subtracted from the drive command value.

The fluid pressure control device 1, according to yet another embodiment, is one in which, in the above-mentioned addition and subtraction processing unit 14, the drive command value from the above-mentioned drive command setting unit 13 has a compensation amount output proportion when straying from the overlapping command value to the supply position side which is different from the compensation amount output proportion when straying to the exhaust position side, and so the solenoid can be smoothly operated by being made to correspond to the characteristics of the force of attraction of a solenoid valve 4 in which the proportion of change increases the higher the drive command value, and conversely the proportion of change decreases the lower the drive command value.

More specifically, as shown in FIG. 1, the force of attraction of the solenoid valve 4 always has a characteristic whereby the higher the drive command value the larger the proportion of variation and, conversely, the lower the drive command value the smaller the proportion of variation. Consequently, the solenoid valve 4 can be smoothly operated, in correspondence with the above-mentioned characteristic of the force of attraction, by setting the output proportion of the compensation amount on the supply position side or the exhaust position side where the drive command value is low such that it is larger than the output proportion of the compensation amount on the exhaust position side or the supply position side where the drive command value is high, with respect to the overlapping command value.

While a presently preferred and a number of alternative embodiments of the present invention have been described in detail above, it should be understood that various other adaptations and/or modifications of the fluid pressure control device may be envisioned by those persons who are skilled in the relevant art without departing from either the spirit of the invention or the scope of the appended claims.

We claim:

1. A method of switching a three-position solenoid valve between a supply position in which output pressure from said three-position solenoid valve is increased, an overlapping position in which said output pressure is held constant, and an exhaust position in which said output pressure is reduced, said method comprising the steps of:

using a pressure sensitive sensor to generate a feedback signal representative of said output pressure from said three-position solenoid valve, computing a desired drive command value by changing said three-position solenoid valve to said exhaust position from said supply position for causing a pressure command signal from a brake control member and said feedback signal to coincide upon receiving said pressure command signal and said feedback signal, providing a compensating value for adding to and subtracting from said drive command value when a proportion of a change in said feedback signal is less than a reference value, and computing a compensation amount by integrating said compensation value so provided when said drive command value strays from an overlapping command value output when said three-position solenoid valve is placed in said overlapping position, and adds or subtracts said compensation amount to or from said drive command value, said drive command value having a compensation amount output proportion when straying from said overlapping command value to said supply position which is different from said compensation amount output proportion when straying to said exhaust position, such adding or subtracting of said compensation amount supplying a new drive command value to said three-position solenoid valve.

2. The method according to claim 1 wherein said compensating value increases or decreases in relation to a pressure differential magnitude occurring between said pressure command signal and said feedback signal.

3. The method according to claim 1 wherein said computed compensation amount is temporarily nullified when said drive command value has newly provided a value for said supply position or said exhaust position of said three-position solenoid valve.

4. A fluid pressure control device characterized in that it comprises:

(a) a 3-position solenoid valve which is controlled to switch between a supply position in which an output pressure is increased, an overlapping position in which said output pressure is cut off, and an exhaust position in which said output pressure is reduced upon receiving a drive command value corresponding to a pressure command signal;

(b) a pressure sensor for generating a feedback signal of said output pressure;

(c) a drive command setting unit for computing a desired drive command value by placing said 3-position solenoid into said exhaust position from said supply position in order to make said pressure command signal and said feedback signal coincide upon receiving said pressure command signal and said feedback signal;

(d) a compensating value setting unit for outputting a compensating value for adding to or subtracting from said drive command value when a proportion of change in said feedback signal is less than a reference value; and (e) an addition and subtraction processing unit for computing a compensation amount by integrating a compensating value provided by said compensating value setting unit when said drive command value has strayed from an overlapping command value output and when said 3-position solenoid valve is placed in said overlapping position, and adds or subtracts said compensation amount to or from said drive command value in a direction departing from said overlapping position for providing a new drive command value to said 3-position solenoid valve, (f) said addition and subtraction processing unit being effective to nullify said computed compensation amount when such overlapping command value has been provided by said drive command setting unit.

\* \* \* \* \*